United States Patent [19]
Herb

[11] Patent Number: 4,579,490
[45] Date of Patent: Apr. 1, 1986

[54] EXPANSION DOWEL ASSEMBLY

[75] Inventor: Armin Herb, Peissenberg, Fed. Rep. of Germany

[73] Assignee: Hilti Aktiengesellschaft, Fürstentum, Liechtenstein

[21] Appl. No.: 643,296

[22] Filed: Aug. 22, 1984

[30] Foreign Application Priority Data

Aug. 22, 1983 [DE] Fed. Rep. of Germany ....... 3330278

[51] Int. Cl.$^4$ ............................................. F16B 13/04
[52] U.S. Cl. ........................................ 411/32; 411/45; 411/55; 411/79; 405/259
[58] Field of Search ............................ 411/16, 50–53, 411/55, 56, 32, 33, 64, 65, 75–80, 68, 57, 39, 45; 405/259

[56] References Cited

U.S. PATENT DOCUMENTS

| 1,033,447 | 7/1912 | Mower | 411/57 |
| 3,427,919 | 2/1969 | Lerich | 411/39 |
| 4,205,587 | 6/1980 | Van der Lugt | 411/75 |

FOREIGN PATENT DOCUMENTS 215874 7/1958 Australia ............................ 411/80

Primary Examiner—Thomas J. Holko
Assistant Examiner—Neill Wilson
Attorney, Agent, or Firm—Toren, McGeady, Stanger, Goldberg & Kiel

[57] ABSTRACT

An expansion dowel assembly includes an anchor bolt and an expansion element made up of at least two expansion element parts offset from one another in the axial and circumferential direction when mounted on the anchor bolt. A web interconnects the adjacent expansion element parts. Recesses are formed in the circumferential surface of the anchor bolt for receiving the expansion element parts. Another recess connects the recesses for the expansion elements parts and is arranged to receive the web interconnecting these parts. The expansion element parts encircle the anchor bolt by more than half of its circumference so that holders are not needed for securing the expansion element on the anchor bolt.

6 Claims, 4 Drawing Figures

EXPANSION DOWEL ASSEMBLY

SUMMARY OF THE INVENTION

The present invention is directed to an expansion dowel assembly formed of an anchor bolt and at least two expansion element parts. The anchor bolt has means located at its trailing end for applying a load and recesses are formed in the circumferential surface of the anchor bolt adjacent its leading end for receiving the expansion element parts. The recesses are offset relative to one another in the axial and circumferential direction and the depth of the recesses increases in the direction toward the trailing end of the anchor bolt.

Expansion dowel assemblies of the above type are used in many fastening chores due to their advantages, such as a simple construction, economical production, problem-free placement, insertion assembly and the like. Such expansion dowel assemblies have a post-spreading behavior under load. In other words, the spreading of the expansion elements in the borehole during the placement process is further increased when the dowel or anchor bolt is stressed.

Known expansion dowel assemblies have the disadvantage that the maximum possible amount of radial expansion is limited, particularly for securing the assembly in the tension zone of a structural part where cracks may exist. Due to the limited amount of expansion, there is the problem that no adequate post-spreading occurs and the dowel may fall out of the borehole. Measures to increase the amount of radial expansion, for instance, by increasing the depth of the recesses for the expansion elements, results in a reduction in the cross-sectional area of the anchor bolt. When the reduced cross-sectional area becomes less than the core cross-sectional area of the means for applying a load, usually in the form of an external thread, then it is possible when the dowel assembly is overstressed that the anchor bolt will break in the expansion region.

To prevent such a reduction in the strength of the anchor bolt, it has been known to position individual expansion elements spaced axially with respect to one another. In particular, where expansion dowel assemblies are intended for use as an anchor in light construction materials or in brick walls, preferably the anchor bolt is provided over its entire installed length located within the receiving material in the anchored condition, with recesses for the expansion elements.

For the uniform distribution of expansion pressure as well as for a post-spreading effect in the entire expansion region, it is necessary during placement that all of the expansion elements reach the expanded condition simultaneously.

Therefore, the primary object of the present invention is to provide an expansion dowel assembly made up of an anchor bolt and at least two expansion element parts in which a simultaneous spreading of the expansion element parts is assured.

In accordance with the present invention, the individual expansion element parts are interconnected by means of webs and the anchor bolt has recesses for both the expansion element parts and for the webs. The axial extension of the recesses for the webs exceeds the axial extension of the webs.

By interconnecting the expansion element parts with webs, one or more of the expansion element parts cannot remain in the original position during placement so that no spreading of the part results. Since the axial extension of the recesses in the anchor bolt exceeds the axial extension of the webs, the axial slidability of the expansion element parts with respect to the anchor bolt is maintained. The difference in the axial measurement of the webs as compared to the recesses is at least as great as the axial distance required for radially outwardly displacing the expansion element parts.

In principle, the webs may extend radially or obliquely with respect to the axis of the anchor bolt. For advantageous force transmission, however, preferably the webs extend in the axial direction of the anchor bolt. As a consequence, during the spreading or expansion process, the webs are only under tensile or compressive stress and may be dimensioned so that they have a relatively small cross-section. Further, the webs may be dimensioned so that, during post-spreading, they are destroyed or broken under a specific load.

For the favorable distribution of the expansion pressure, it is advantageous when the expansion element parts are in the form of curved plate-like or shell-shaped members. A curved plate-like shape of the expansion element parts facilitates engagement of the parts on the dowel or anchor bolt body. To position the expansion element parts on the anchor bolt, in accordance with another feature of the invention, the expansion element parts and the recesses in which they are positioned extend over approximately one-third of the circumference of the anchor bolt. If, for instance, two expansion element parts are used with each extending approximately for one-third of the circumference of the anchor bolt, then in combination they extend for more than half of the circumference although they partially overlap in the circumferential direction. As a result, the negative clamping effect which occurs when a single expansion element parts extends over more than half of the periphery, does not take place. If three expansion element parts are used, spreading of the expansion dowel assembly takes place uniformly from three sides. In practice, the expansion element parts can be manufactured as punched parts from sheet metal of a uniform thickness. To assure equal spreading, it is advantageous if the expansion element parts have a reduced thickness toward the leading end of the parts, such a thickness reduction may be subsequently applied to the extension element parts. It is preferably if the thickness reduction in the expansion element parts corresponds to a complementary reduction in the depth of the recesses in the circumferential surface of the anchor bolt.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
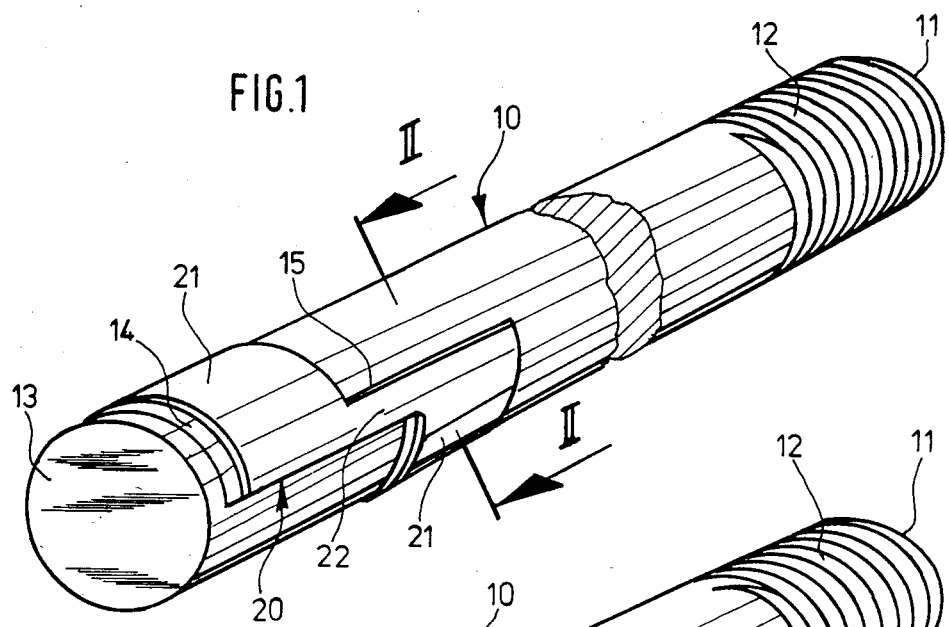
FIG. 1 is a perspective view of an expansion dowel assembly embodying the present invention in the unspread state.

The expansion dowel assembly shown in the drawing is made up of an anchor bolt 10 and an expansion element 20. The expansion element 20 includes two expansion element parts 21 in the form of curved plate-like members interconnected by a web 22 extending in the axial direction of the anchor bolt 10. The anchor bolt has a trailing end 11 and a leading end 13, that is, the leading end is the end of the expanding dowel assembly which is inserted first into a borehole into which the assembly is to be secured. The trailing end 11 of the anchor bolt 10 has an axially extending thread 12 formed on the circumferential surface of the bolt so that a load or stress can be applied to the bolt. Adjacent the leading end 13 of the anchor bolt 10, recesses 14 are formed in the circumferential surface of the bolt. The recesses 14 are arranged to receive the expansion element parts 21 of the expansion element 20. The recesses 14 are spaced apart in the axial and the circumferential direction of the anchor bolt and are interconnected by an axially extending recess 15 into which the web 22 of the expansion element is received.

Figure 2:
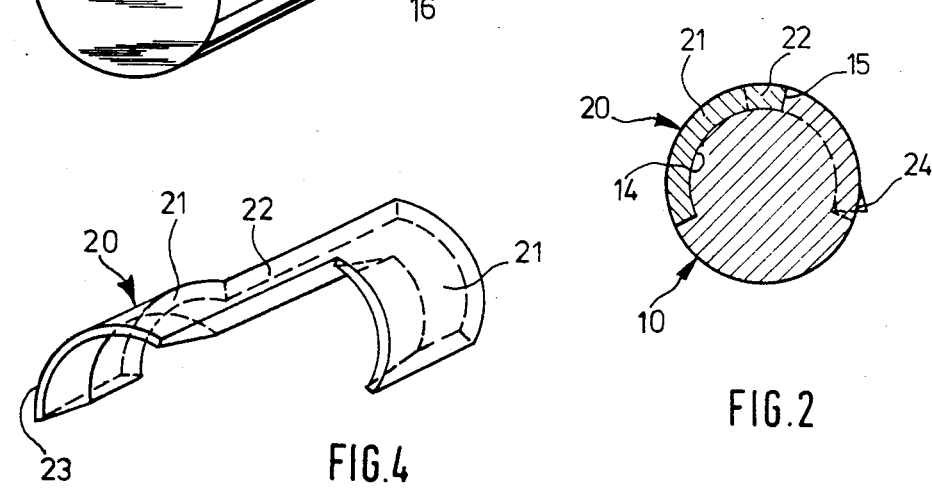
FIG. 2 is a cross-sectional view taken along the line II—II in FIG. 1.

As can be seen, particularly in FIG. 2, the expansion element parts 21 of the expansion element 20 each extend for approximately one-third of the circumferential dimension of the anchor bolt. When the assembly is inserted into the borehole and a nut is run up on the thread 12, to prevent the expansion element from rotating with the anchor bolt, one of the expansion element parts 21 is provided with a projection 24 extending radially outwardly beyond the outer circumferential surface of the anchor bolt 10. Such a projection 24 holds the expansion element 20 against rotation along with the anchor bolt.

Figure 4:
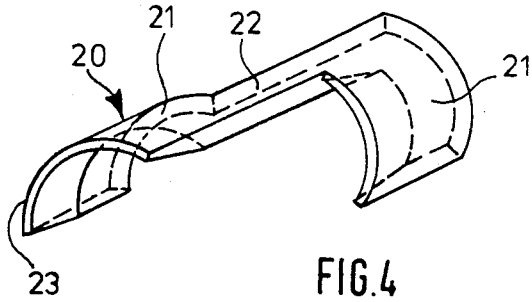
FIG. 4 is a perspective view of the expansion element as shown in FIG. 1.

In FIG. 4 the expansion element parts 21 of the expansion element 20 are shown with a reduced thickness from a point approximately axially midway of the parts to the leading end of each part. Complementary to the tapered arrangement of the forward portion of the expansion element parts, the recesses 14 in the circumferential surface of the anchor bolt are also provided with a reduced depth in the direction toward the leading ends of the recesses. In other words, the forward portions 16 taper upwardly in the direction toward the leading end 13 of the anchor bolt 10. Such an arrangement of the expansion element 20 and the anchor bolt 10 affords parallel spreading. Since the two expansion element parts 21 of the expansion element 20 partially encircle the circumference of the anchor bolt by more than 180°, no additional means are needed to hold the expansion element 20 on the anchor bolt. By connecting the expansion element parts 21 with the web 22, it is guaranteed, during the spreading or expanding process, that both expansion element parts are displaced into the spread position simultaneously.

In place of the illustrated embodiment using two expansion element parts 21, three or more of such parts may be interconnected for affording a greater anchoring length. A significant advantage of the arrangement of the expansion element parts 21 on the anchor bolt 10 is that the remaining cross-section of the anchor bolt in any position along the expansion region has a larger cross-sectional area than the core cross-sectional area of the external thread 12. As a consequence, if the anchor bolt is overstressed, it does not fail or break in the expansion region, but in the axial region of the external thread 12.

Figure 3:
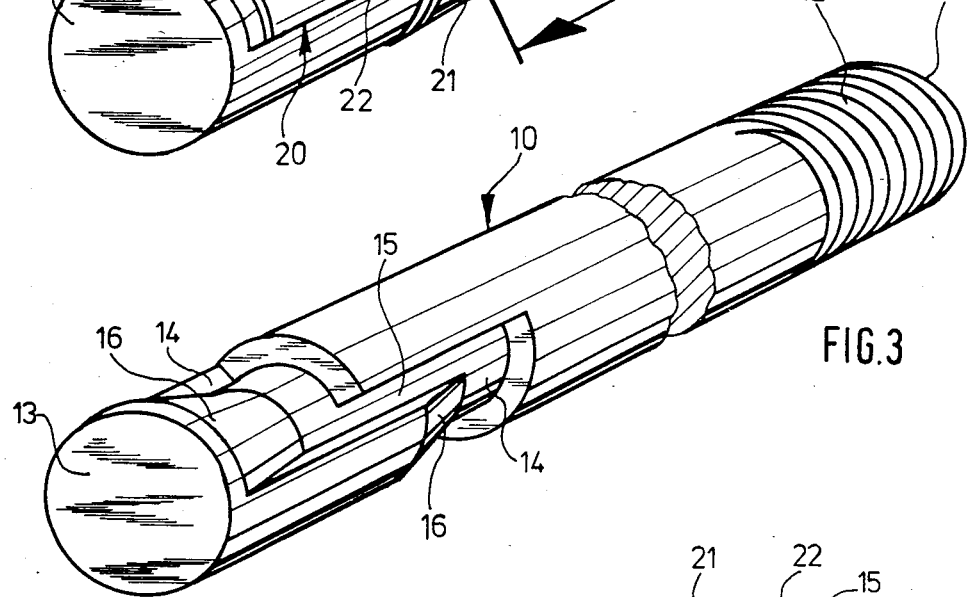
FIG. 3 is a perspective view, similar to FIG. 1, but without the expansion element.

As illustrated in FIG. 3, the recesses 14 in the circumferential surface of the anchor bolt have a single stage tapered abutting surface 16 for the expansion element parts 21. To attain a favorable pull-out behavior, particularly when the dowel assembly is used in fractured tension zones of the receiving material in which the dowel assembly is inserted, the abutting surface 16 may also have a multi-stage construction, wherein a portion of the surface 16 has an increased slope toward the leading end 13 of the anchor bolt 10.

While specific embodiments of the invention have been shown and described in detail to illustrate the application of the inventive principles, it will be understood that the invention may be embodied otherwise without departing from such principles.

I claim:

1. An expansion dowel assembly comprises an axially extending anchor bolt and an expansion element including at least two expansion element parts extending in the axial direction of said anchor bolt, each of said anchor bolt and said expansion element parts has a leading end and a trailing end spaced apart in the axial direction, means on the trailing end of said anchor bolt for applying a load, said anchor bolt has a circumferential surface extending between the leading and trailing ends thereof, said circumferential surface having first recesses formed therein extending in the circumferential and axial directions of said anchor bolt, said first recesses being axially and circumferentially offset relative to one another with each of said recesses decreasing in depth in the direction toward the leading end of the anchor bolt, each of said expansion element parts being located within a different one of said first recesses in said anchor bolt and being spaced apart in the axial direction and offset in the circumferential direction, and a web extends generally axially between and interconnects adjacent said expansion element parts, and a second recess in the circumferential surface of said anchor bolt interconnecting said first recesses in the axial direction and arranged to receive said web.

2. An expansion dowel assembly, as set forth in claim 1, wherein the axial length of said second recess is greater than the axial dimension of said web.

3. An expansion dowel assembly, as set forth in claim 1, or, wherein said expansion element parts have a curved plate-like shape.

4. An expansion dowel assembly, as set forth in claim 3, wherein each of said expansion element parts and said first recesses extend in the circumferential direction for approximately one-third of the circumferential dimension of said anchor bolt.

5. An expansion dowel assembly, as set forth in claim 4, wherein each of said expansion element parts has a leading end closer to the leading end of said anchor bolt and a trailing end closer to the trailing end of said anchor bolt and said expansion element parts have a reduced thickness in the axial direction from a location intermediate the leading and trailing ends thereof to the leading end.

6. An expansion dowel assembly, as set forth in claim 1, wherein each of said expansion element parts has an inner surface arranged to contact the base of one of said first recesses in said anchor bolt and the inner surface of said expansion element part is formed complementary to the surface of said first recess into which said expansion element part is placed.

* * * * *